United States Patent Office 3,842,065
Patented Oct. 15, 1974

3,842,065
HOMO-(TYR⁵')-LRF AND THR⁴-LRF AND
INTERMEDIATES
Richard W. Rees, Bryn Mawr, Pa., assignor to American
Home Products Corporation, New York, N.Y.
No Drawing. Filed Feb. 22, 1973, Ser. No. 334,794
Int. Cl. A61k 27/00; C07c 103/52; C07g 7/00
U.S. Cl. 260—112.5                    6 Claims

ABSTRACT OF THE DISCLOSURE

Analogs of the decapeptide luteinizing hormone release factor (LRF) are described, namely Homo-(Tyr⁵')-LRF and Thr⁴-LRF as well as their synthesis by solid phase techniques. The novel peptides are antagonists to LRF.

This invention relates to novel decapeptides and undecapeptides, their process of synthesis and intermediates used in their manufacture.

The luteinizing horomone releasing factor (hereafter called LRF) is the decapeptide, L-(5-oxoprolyl)-L-histidyl - L - tryptophyl-L-seryl-L-tyrosyl-glycyl-L-leucyl-L-arginyl-L-prolyl-glycine amide. This decapeptide is secreted by the hypothalamus and carried to the adenohypophysis where it stimulates the release of the luteinizing hormone and the follicle stimulating hormone. The present invention concerns itself with structural modifications of LRF to devise antagonists to LRF, that is to suppress the LRF-stimulated secretion of luteinizing hormone (LH).

The novel peptides of the present invention are represented by the compounds of the formula:

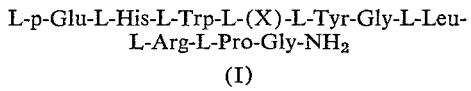

(I)

wherein X is selected from the class consisting of Thr and Ser-L-Tyr. When X is Thr the resulting compound is the decapeptide Thr⁴-LRF and when X is Ser-L-Tyr the resulting compound is the undecapeptide Homo-(Tyr⁵')-LRF; and their non-toxic salts.

Illustrative of pharmaceutically acceptable acid addition salts are hydrochloride, hydrobromide, sulfate, phosphate, maleate, acetate, citrate, benzoate, succinate, malate, ascorbate, and the like.

Also contemplated within the scope of the present invention are intermediates of the formula:

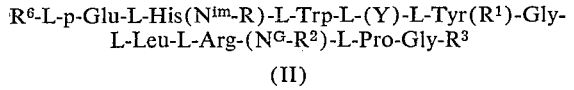

(II)

wherein:

Y is selected from the class consisting of Thr(R⁴) and Ser(R⁵)-L Tyr(R¹);
N$^{im}$ means the nitrogen atoms of the imidazole ring of histidine;
N$^G$ means the side chain nitrogen atoms of arginine;
R is a protecting group for the nitrogen atoms of the imidazole ring selected from the class consisting of tosyl, benzyl, trityl, 2,2,2-trifluoro-1-benzyloxycarbonylaminoethyl and 2,2,2-trifluoro-1-tert-butoxycarbonylaminoethyl or R is hydrogen which means there are no protecting groups on the nitrogen atoms of the imidazole ring;
R¹ is a protecting group for the phenolic hydroxyl group of tyrosine selected from the class consisting of acetyl, tosyl, benzoyl, tert-butyl, trityl, benzyl and benzyloxycarbonyl. The preferred protecting group is benzyl; or R¹ is hydrogen which means there is no protecting group on the phenolic hydroxy function;

R² is a protecting group for the N$^δ$, N$^ω$ and N$^{ω'}$ nitrogen atoms of arginine selected from the class consisting of nitro, tosyl, benzyloxycarbonyl, adamantyloxycarbonyl and trityl; or R² is hydrogen which means there are no protecting groups on the side chain nitrogen atom of arginine. Where the protecting group is nitro or tosyl, the protection is on either one of the N$^ω$, N$^{ω'}$ nitrogens and in the case of benzyloxycarbonyl, trityl or adamantyloxycarbonyl, the protection is on the N$^δ$ nitrogen and either one of the N$^ω$, N$^{ω'}$ nitrogen atoms. The preferred protecting group defined by R² is nitro.
R³ is selected from the class consisting of NH₂ and O-(lower) alkyl, wherein (lower) alkyl is C₁ through C₆ (e.g. methyl, ethyl, pentyl, etc.)
R⁴ and R⁵ are protecting groups for the alcoholic hydroxyl group of threonine and serine and is selected from the class consisting of those members defined by R¹ or R⁴ and R⁵ are hydrogen which means there is no protecting group on the alcoholic oxygen atom. Preferably R⁴ and R⁵ are benzyl; with the further proviso that at least one of R, R¹, R², R⁴ and R⁵ is always a protecting group; and
R⁶ is either hydrogen or an α-amino protecting group.

The α-amino protecting groups contemplated by R⁶ are those known to be useful in the art in the step-wise synthesis of polypeptides. Among the classes of α-amino protecting groups covered by R⁶ are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethane protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R⁶ are selected from the class consisting of tert-butyloxycarbonyl, benzyloxycarbonyl, trityl, phthalylt, tosyl, allyloxycarbonyl, cyclopentyloxycarbonyl and tert-amyloxycarbonyl.

A further aspect of the present invention relates to intermediates linked to a solid resin support. These intermediates are represented by the formula:

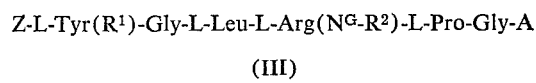

(III)

wherein:

Z is selected from the class consisting of R⁷-L-Thr(R⁴) and R⁷-L-Ser(R⁵)-L-Tyr(R¹);
R⁷ is an α-amino protecting group of hydrogen (deprotected α-amino group). The α-amino protecting group is preferably tert-butyloxycarbonyl (tert-Boc) which protecting group is also preferably used for protecting the α-amino group of all amino acids added in the step-wise solid phase synthesis. However, other α-amino protecting groups may be used such as o-nitrobenzylsulfenyl, t-amyloxycarbonyl and biphenylisopropyloxycarbonyl;

A is an anchoring bond used in solid phase synthesis linked to a solid resin supported. A is selected from the class consisting of

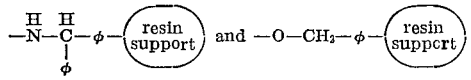

The symbol φ means "phenyl."

In selecting a particular side chain protecting group to be used in the synthesis of the peptides of formula (I), the following rules should be followed: (a) the protecting group must be stable to the reagent and under the reaction conditions selected from removing the α-amino protecting group at each step of the synthesis, (b) the protecting group must retain its protecting properties (i.e. not be split off under coupling conditions, and (c) the side chain protecting group must be removable upon the completion of the synthesis containing the desired amino acid sequence under reaction conditions that will not alter the peptide chain.

The peptides of formula (I) are prepared using solid phase synthesis. The synthesis is commenced from the C-terminal end of the peptide using an α-amino protected resin. Such a starting material can be prepared by attaching an α-amino protected glycine to a benzhydrilamine resin, a chloromethylated resin or a hydroxymethyl resin, the former being preferred. The preparation of a benzhydrilamine resin is described by P. Rivalille et al., Helv. 54, 2772 (1971) and the preparation of the hydroxymethyl resin is described by Bodanszky et al., Chem. Ind (London 38, 1597–98 (1966). A chloromethylated resin is commercially available from Bio Rad Laboratories, Richmond, California. In using the benzhydrilamine resin an amide anchoring bond is formed with the α-amino protected glycine as follows:

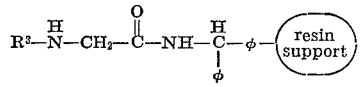

This permits the C-terminal amide function to be obtained directly after the amino acid sequence in the synthesis is complete by cleaving off the resin support to form the glycone amide at the C-terminal portion of the desired peptide of formula (I). When the other resins are used the anchoring bond is the benzylester group as defined supra in Formula (III), which after cleavage of the peptide from the resin support must be converted to the C-terminated amide. The preferred procedure is to ammonalyse the protected peptide off the resin and then remove the protecting group by hydrogenolysis or by hydrogen fluoride cleavage. An alternate procedure would be to cleave by transesterification with methanol/(Et)$_3$N and then convert the resulting ester into an amide and subsequently deprotect as described above. See J. M. Steward "Solid Phase Peptide Synthesis," pp. 42–46 (W. H. Freeman & Co. 1969).

The α-amino protected glycine is coupled to the benzhydrilamine resin with the aid of a carboxyl group activating compound such as dicyclohexyl carbodiimide. Following the coupling of the α-amino protected glycine to the resin support, the α-amino protecting group is removed such as by using trifluoroacetic acid in methylene chloride, trifluoroacetic acid alone or HCl in dioxane. The deprotection is carried out at a temperature between about 0° C. and room temperature. Other standard cleaving reagents and conditions for removal of specific α-amino protecting groups may be used as described in Schroder & Lubke, "The Peptides," 1, 72–75 (Academic Press 1965). After removal of the α-amino protecting group the remaining α-amino protected amino acids are coupled step-wise in the desired order to obtain a compound of formula (I). However, as an alternate to adding each amino acid separately to the reaction, some of them may be coupled prior to addition to the solid phase reactor. For example sequence R$^7$-Tyr(R$^1$)-glycine can be added as a unit to the reactor. Each protected amino acid or amino acid sequence, is introduced into the solid phase reactor in about a four-fold excess and the coupling is carried out in a medium of dimethylformamide: methylene chloride (1:1) or in dimethylformamide or methylene chloride alone. In cases where incomplete coupling occurred the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser et al., Analyt. Biochem, 34, 595 (1970).

After the desired amino acid sequence of formula II has been synthesized, the peptide is removed from the resin support by treatment with a reagent such as hydrogen fluoride which not only cleaves the peptide from the resin- but also cleaves all remaining side chain protecting groups and the α-amino protecting group (if present) on pyroglutamic acid to obtain directly a compound of formula I in the case where the benzhydrilamine resin was used. Where a chloromethylated resin is used the peptide may be separated from the resin by methanolysis after which the recovered product is chromatographed on silica gel and the collected fraction subjcted to ammonlysis to convert the methyl ester to the C-terminal amide. Any side chain protecting group may then be cleaved as previously described or by other procedures such as catalytic reduction (e.g. Pd on BaSO$_4$) using conditions which will keep the Trp moiety intact. When using hydrogen fluoride for cleaving, anisole is included in the reaction vessel to prevent the oxidation of labile amino acid (e.g. tryptophan).

The solid phase synthesis procedure discussed supra is well known in the art and has been essentially described by M. Monahan et al., C. R. Acad. Sci, Paris, 273, 508 (1971).

The nomenclature used for peptides is described by Schroder & Lubke, supra, pp. VIII–XXIX and in Biochemistry 11, 1726–1732 (1972).

The following examples are illustrative of the preparation of the compounds of formulas I through III.

EXAMPLE 1

(a) L-Pyroglutamyl - N$^{im}$ - tosyl - L - histidyl - L - tryptophyl - O - benzyl - L - threonyl - O - benzyl-L-tyrosylglycyl - L - leucyl - N$^{guan}$ - NO$_2$ - L - arginyl-L-prolyl-glycinamide-benzhydrilamine resin Benzhydrilamine resin (25.0 g.) is put in a Merrifield vessel of 300 ml. capacity and put through the following wash cycle (a) methylene chloride; (b) methylene chloride: trifluoroacetic acid (1:1) (two times for ten minutes each); (c) methylene chloride; (d) methanol; (e) triethylamine 12.5% in dimethylformamide (two times for ten minutes each); (f) methanol (two times); (g) methylene chloride (two times), allowing a contact time of at least three minutes each, if not indicated otherwise.

The resin so prepared is then gently shaken with t-butoxycarbonylglycine (3.52 g. or 20 mmole) in methylene chloride-dimethylformamide (1:1 while a total of 25 ml. (25 mmole) of 1 M dicyclohexylcarbodiimide (DCC) in methylene chloride is added in two portions over a period of 0.5 hrs. Shaking is then continued at ambient temperature for a total of 18 hrs. A sample withdrawn after that time showed it to be slightly positive to ninhydrine indicating unsubstituted sites on the resin. Acylation with 20 ml. acetic anhydride in methylene chloride for 45 min. acetylated the remaining free amino groups completely. The resin is as a result of the foregoing treatment substituted to the extent of about 0.4 mmoles t-Boc-glycine per one gram of resin.

The removal of the α-amino protecting group (i.e. t-Boc) from the t-Boc glycine amino acid residue linked to resin is carried out as follows: The resin is treated with three portions of methylene chloride-trifluoroacetic acid (1:1) for a total of 30 minutes, then steps (c), (d), (e), (f) and (g), as described previously in the wash cycle, are performed.

The following amino acid residues are introduced consecutively into the solid phase reaction vessel: t-Boc-proline (25 mmole, 36 mmole DCC), t-Boc-nitro-arginine (31 mmole, 36 mmole DCC), t-Boc-leucine (30 mmole, 36 mmole DCC) and t-Boc-O-benzyltyrosylglycine (30 mmole, 36 mmole DCC). After the addition of each α-amino protected amino acid or amino acid unit, the t-Boc group is cleaved in the same manner as previously described for the cleavage of the t-Boc group from the glycine amino acid residue linked to the resin. At this point in the synthesis the resin to which is linked t-Boc-L-Tyr-Gly-L-Leu-L-Arg-($NO_2$)-L-Pro-Gly- is removed before the deblocking step, dried and weighed. The weight of the resin is now 32.5 g. The synthesis is then continued using one half of the resin (16.25 g.) and the following amino acid residues are added: t-Boc-O-benzyl-L-threonine (16 mmole, 18 mmole DCC), t-Boc-tryptophan (15 mmole, 18 mmole DCC), t-Boc-$N^{im}$-tosylhistidine (14 mmole, 22 mmole DCC) and pyrogdutamic acid (23 mmole, 27 mmole DCC). In the foregoing sequence, the α-amino protecting group is removed from each amino acid after it has been coupled in the same manner as described for the deprotection of the t-Boc-glycine amino acid residue except in the case of t-Boc-tryptophan, after this amino acid is coupled, the t-Boc group is removed with trifluoroacetic acid—methylene chloride (1:1) containing 5% 1,2-ethanedithiol. The resin having linked to it ten amino acid residues in the desired sequence as represented by the titled compound of this example is removed from the solid phase reaction vessel and dried under vacuo for 18 hrs. at ambient temperature.

Example 2

L-Pyroglutamyl-L-histidyl - L - tryptophyl-L-threonyl-L-tyrosylglycyl-L-leucyl-L-arginyl-L-proplyl - glycinamide ($Thr^4$-LRF)

The side chain protected decapeptide resin obtained in Example 1 is treated in vacuo with anhydrous hydrogen fluoride (80 ml.) containing 30 ml. of anisole for 45 min. at 0° C. The hydrogen fluoride and anisole are then removed in vacuo as quickly as possible and then the residue is washed with either, 10% acetic acid and methanol. The acetic acid extract is then lyophilized to yield 6.1 g. of foam representing the crude above titled product.

The above-titled product is purified and characterized as follows:

Chromatography of the crude peptide isolated above on a cation exchange carboxymethyl cellulose column (CM–52) 2.8 cm. diameter and 28 cm. height and eluting with 1000 ml. of each 0.0–0.4 M ammonium acetate linear gradient and taking 13 ml. cuts gives four major peptide fractions: 32–39 (96.07 mg.); 40–49 (848.8 mg.); 50–57 (671.2 mg.) and 58–67 (309.9 mg.). The purest material is in the first fraction as seen by thin layer chromatography in the system BAW (4:1:5).

The fractions 32–39 are applied to a BAW (4:1:5) column 3 cm. in diameter and 80 cm. in heights and eluted with upper phase. In taking 12 ml. cuts, the following peptide fractions are obtained: (A) 40–52 (225.6 mg.), (B) 53–67 (305.7 mg.), (C) 68–80 (172.5 mg.), (D) 81–90 (46.4 mg.), and (E) 91–100 (10.5 mg.). Rechromatography of fractions C and D on the same column gives 152.0 mg. of pure $Thr^4$-LRF as seen by thin layer chromatography in the following system: BAW (4:1:5). $[\alpha]_D = -52.81$ (c.=0.999, 1% acetic acid). Amino acid analysis gives the following values: Trp (0.75), $NH_3$ (1.43), Arg (0.98), Tyr (1.02), Glu (1.04), Pro (1.20), Gly (2.01), Leu (1.03), His (1.00), Thr (0.88).

Example 3

Carbobenzoxy-L-pyroglutamyl-$N^{im}$-tosyl - L - histidyl-L-tryptophyl-O-benzyl - L - seryl-O-benzyl-L-tyrosyl-O-benzyl - L - tyrosylglycyl-L-leucyl-$N^G$-$NO_2$ L-arginyl-L-prolylglycyl-resin Benzhydrilamine resin 25.0 g.) is placed in a 300 ml. Merrifield vessel and washed with (a) methylene chloride, (b) trifluoroacetic acid (three times for 10 min. each), (c) methylene chloride, (d) methanol (two times), (e) triethylamine 12.5% in dimethylformamide (two times for 10 min. each), (f) methanol (two times), (g) methylene chloride (two times). After that t-Boc-glycine (3.52 g., 20 mmole) in methylene chloride is shaken gently with two portions of 12.25 ml. of 1 M dicyclohexylcarbodiimide (DCC) in methylene chloride for 18 hrs. at ambient temperature, then the solvent is drained and the resin washed with methanol, methylene chloride, methanol (two times) and methylene chloride (two times). A sample is withdrawn and showed a slightly positive ninhydrine reaction. Therefor, the coupling step is repeated with another 1.75 g. (10 mmole) of t-Boc glycine and 13 ml. (13 mmole) of 1 M DCC for a total of 4 hrs. After the washing with methanol, methylene chloride as described above, the resin is acylated with 20 ml. of acetic anhydride in methylene chloride overnight. After washing the resin again in the manner previously described herein, a sample is found to be negtive to ninhydrine and showed the t-Boc-glycine amino acid residue substitution to be about 0.4 mmole per one gram of resin.

The removal of the α-amino protecting group (i.e. t-Boc) from the t-Boc-glycine amino acid residue linked to the resin is carried out in trifluoroacetic acid three times for a total of 30 minutes and the washings are carried out as previously described in steps (c), (d), (e), (f) and (g). Thereafter, 20 mmole of each of the following amino acid residues is added consecutively to the solid phase reaction vessel together with 25 mmole of DCC in each case: t-Boc-proline, t-Boc-nitro-arginine, t-Boc-leucine, t-Boc-O-benzyl-tyrosylglycine. After the addition of each α-amino protected amino acid residue, and prior to coupling the next amino acid residue in the sequence, the t-Boc group is cleaved in the same manner as previously described for the cleavage of the t-Boc group from the glycine amino acid residue linked to the resin. The coupling of each amino acid is carried out in a mixture of methylene chloride-dimethylformamide (1:1).

After the t-Boc-O-benzyl-tyrosylglycine is coupled, the resin is withdrawn from the Merrifield vessel before removing the t-Boc group and dried in vacuo overnight. The resin is divided in half and the synthesis continued on half the scale. The following amino acids are coupled to the resin in a medium of methylene chloride—dimethylformamide (1:1) with the aid of DCC: t-Boc-O-benzyl-tyrosine (10 mmole, 10 mmole DCC), t-Boc-O-benzylserine (7.5 mmole, 8 mmole DCC), t-Boc-tryptophan (7.5 mmole, 8 mmole DCC), t-Boc-$N^{im}$-tosyl-histidine (10 mmole, 11.2 mmole DCC) and carbobenzoxypyroglutamic acid (10 mmole, 15 mmole DCC). After the addition of the t-Boc-tryptophane, the t-Boc group is cleaved in a medium of trifluoroacetic acid—methylene chloride (1:1) containing 5% 1,2-ethanedithiol. In all other cases the t-Boc group is cleaved in the manner previously described.

EXAMPLE 4

L - Pyroglytamyl - L - histidyl - L - tryptophyl - L - seryl-L - tyrosyl - L - tyrosylglycyl - L - leucyl - L - arginyl-L-prolylglycinamide (Homo-$Tyr^{5'}$-LRF)

The product from Example 3 is treated in vacuo with hydrogen fluoride (70 ml.) and anisole (20 ml.) at ice bath temperature for 40 minutes. The hydrogen fluoride and the anisole are then removed as quickly as possible and the remaining solids extracted with ether, 10% acetic acid and methanol. The acetic acid extract is then lyophilized to leave 4.17 g. of crude above-titled product.

The foregoing crude product is purified and characterized as follows:

4.17 g. of the crude product is applied in 35 ml. of water to a column of 3.0 cm. diameter and 20 cm. heights containing 100 g. of carboxy methyl cellulose CMM–52 preswollen) previously equilibrated to pH 4.5. The column then is eluted with a 0–0.4 M, pH 4.5 linear aqueous ammonium acetate gradient (reservoir and mixing vessels 1000 ml. each). Fraction of 13 ml. each is taken. Analysis of the effluent from the column is carried out by UV absorbance at 280 m$\mu$. Three main peptides containing fractions (A) 66–77 (454 mg.), (B) 78–83 (231 mg.), and (C) 84–92 (341 mg.) are obtained. Fraction B and C (685 mg.) is shown by thin layer chromatography system BAW (4:1:1) (n-butanol: acetic acid: water) and chloroform:methanol:ammonia (60:45:25) to contain the same major material. They are combined and applied to a BAW (4:1:5) partition column prepared on a bed of Sephadex G–25 fine (3 cm. in diameter and 80 cm. in height) and eluted with upper phase. Fractions of 15 ml. each are taken and the column effluent monitored as previously described. Three major fractions are obtained (A) 26–31 (147 mg.), (B) 32–36 (171 mg.), (C) 37–42 (170 mg.). Fraction B is homogeneous by thin layer chromatography in two systems, BAW (4:1:1) and i-propanol: 1 N AcOH (2:1) and also by high voltage electrophoresis on cellulose plates in 0.1 M TEAB[(N(Et)$_3$H.HCO$_3$] at 800 v. Fractions A and C are essentially identical with the exception of trace impurities. Thin layer chromatograms are visualized with I$_2$, Pauly and Ehrlich spray.

The optical rotation is measured on a Carl Zeiss LEP A–2 photoelectric precision polarimeter at 546 and 578 m$\mu$ and extrapolated to 589 m$\mu$. ($\alpha_D$-line) [$\alpha$]$_D$—47.29° (c.=0.995 in 1% acetic acid). After hydrolysis of the peptide in 6, NHCl containing 0.4% thioglycolic acid, 4 hours 145° C. in a closed system under nitrogen, the following values for Homo-(Tyr$^5$')-LRF are obtained: Trp (0.64), His (1.00), NH$_3$ (1.69), Arg. (0.99), Ser. (0.83), Glu (1.07), Pro (1.13), Gly (2.05), Leu (1.04, Tyr (2.00).

The compound of Example 4, was tested for its ability to release luteinizing hormone (LH), prolactin (Pr) and growth hormone (GH) from the pituitary and for its ability to antagonize the releasing action of LRF. These tests were performed in rat tissue cultures, modeled after the method of Vale et al., Endocrinology 91, 562 (1972) and the amount of hormone released was determined by radioimmunoassay in accordance with the method described by Bernson et al. Metabolism, 13, 1135 (1964). The compound of Example 4, was added to cultures of dispersed rat anterior pituitary cells at molar ratios of 5×10$^3$ to 10$^4$ times that of the LRF. The results are shown in Table I below.

TABLE I

| Number | Homo-tyr$^5$', LRF (g./ml.) | LRF (g./ml.) | Hormone secreted, ng./ml.±S.E.M. | | |
|---|---|---|---|---|---|
| | | | LH | PR | GH |
| 1 | | | 32±4 | 71±8 | 127±22 |
| 2 | | 10$^{-4}$ | **159±4 | +70±3 | *191±13 |
| 3 | | | 26±3 | | |
| 4 | | 5×10$^{-9}$ | **104±5 | | |
| 5 | 5×10$^{-5}$ | 5×10$^{-9}$ | **57±6 | | |
| 6 | 5×10$^{-6}$ | 5×10$^{-9}$ | **72±9 | | |
| 7 | | | 116±16 | | |
| 8 | | 5×10$^{-9}$ | 378±40 | | |
| 9 | 5×10$^{-5}$ | | 241±35 | | |
| 10 | 5×10$^{-6}$ | | 149±14 | | |
| 11 | 5×10$^{-7}$ | | 136±13 | | |
| 12 | 5×10$^{-5}$ | 5×10$^{-9}$ | 238±16 | | |
| 13 | 5×10$^{-6}$ | 5×10$^{-9}$ | 359±18 | | |
| 14 | 5×10$^{-7}$ | 5×10$^{-9}$ | 340±39 | | |

NOTE: +Not significantly different from the control; *p<0.05; **p<0.01; Comparisons made against endogenous control of LRF control, whichever is applicable.

The foregoing results show that Homo-tyr$^5$'-LRF stimulates the release of LH (Exp. 2) to a greater extent than LRF at the indicated dose levels. Experiment 2 also indicates that Homo-tyr$^5$'-LRF stimulated the release of growth hormone when compared to the endogenous control (Experiment 1). Experiments 5 and 6 show that homo-tyr$^5$'-LRF at dose of 5×10$^{-5}$ and 5×10$^{-6}$ (g./ml.) was able to decrease the secretion of LH which is simultaneously stimulated by LRF (compare LH secretion in Experiment 4 with LH secretion in Experiments 5 and 6).

The compound of Example 2, Thr$^4$-LRF was tested in the same procedure as Homo-tyr$^5$'-LRF for its ability to release LH, Pr and GH from the pituitary. The results are shown in Table II below.

TABLE II

| Experiment | [Thr]$^4$, LRF (g./ml.) | LRF | Hormone secreted, ng./ml.±S.E.M. | | |
|---|---|---|---|---|---|
| | | | LH | PR | GH |
| 1 | | | 44±2 | 62±5 | 119±16 |
| 2 | 10$^{-4}$ | | **207±68 | **106±3 | +142±52 |
| 3 | | | 109±14 | | |
| 4 | | 7.5×10$^{-9}$ | 531±24 | | |
| 5 | 10$^{-3}$ | | 494±12 | | |
| 6 | 2×10$^{-8}$ | | 486±29 | | |
| 7 | 5×10$^{-9}$ | | 335±15 | | |

NOTE: +Not significantly different from the control; *p<0.05; **p<0.01.

Thr$^4$-LRF substantially increased the secretion of LH at the indicated dose as well as stimulating the release of prolactin. The potency of Thr$^4$-LRF compares to LRF itself in its ability to release LH. In vivo tests also indicate that Thr$^4$-LRF stimulates the release of LH. In vivo tests in male Sprague Dowley rats given Thr$^4$-LRF intravenously increased the secretion of LRF at a dose of 636 ng./kg.

The compounds of formula I of this invention may be administered to mammals intravenously or subcutaneously for the treatment of infertility and ovulation regulation and control since LH is known to trigger ovulation in mammals (see Schally et al., Am. J. Obstet. Gynecol. pp. 423–442 Oct. 1, 1972).

What is claimed is:

1. A compound selected from the group consisting of

L - p - Glu - L - His - L - Trp - L - (X) - L - Tyr - Gly-L-Leu-L-Arg-Pro-Gly-NH$_2$ (I)

and

R$^6$ - L - p - Glu - L - His(N$^{\text{im}}$ - R) - L - Trp - L - (Y) - L-Tyr(R$^1$)-Gly-L-Leu-Arg(N$^G$-R$^2$)-L-Pro-Gly-R$^3$ (II)

and its non-toxic salts; wherein

X is selected from the class consisting of -Thr- and Ser-L-Tyr;

Y is selected from the class consisting of -Thr(R$^4$)- and -Ser(R$^5$)-L-Tyr(R$^1$)-;

R is a protecting group for the nitrogen atoms of the imidazole ring selected from the class consisting of tosyl, benzyl, trityl, 2,2,2-trifluoro-1-benzyloxycarbonylaminoethyl and 2,2,2-trifluoro-1-tert-butyloxycarbonylaminoethyl or R is hydrogen;

R$^1$ is a protecting group for the phenolic hydroxyl group of tyrosine selected from the class consisting of acetyl, tosyl, benzoyl, tert-butyl, trityl, benzyl and benzyloxycarbonyl or R$^1$ is hydrogen;

R$^2$ is a protecting group for the N$^δ$, N$^ω$, and N$^{ω'}$ nitrogen atoms of arginine selected from the class consisting of nitro, tosyl, benzyloxycarbonyl, adamantyloxycarbonyl and trityl; or R$^2$ is hydrogen;

R$^3$ is selected from the class consisting of NH$_2$ and —O—(lower) alkyl;

R$^4$ and R$^5$ are protecting groups for the alcoholic hydroxy group of threonine and serine and are selected from the class consisting of of acetyl, tosyl, benzoyl, tert-butyl, trityl, benzyl and benzyl oxycarbonyl or R$^4$ and/or R$^5$ is hydrogen; with the proviso that at least one of R, $R^1$, $R^2$, $R^4$ and $R^5$ is always a protecting group; and $R^6$ is selected from the class consisting of hydrogen or an α-amino protecting group.

2. A compound according to claim 1 wherein $R^3$ is $NH_2$.

3. A compound of the formula:

L-p-Glu-L-His-L-Trp-L-(X)-L-Tyr-Gly-L-Leu-L-Arg-L-Pro-Gly-$NH_2$ and its non-toxic acid addition salts; wherein X is selected from the class consisting of -Thr- and -Ser-L-Tyr-.

4. A compound according to claim 3 which is selected from: L-(5-oxoprolyl)-L-histidyl-L-tryptophyl-L-seryl-L-tyrosyl - L - tyrosyl - glycyl - L - leucyl - L - arginyl - L-prolyl-glycinamide and its non-toxic acid addition salts.

5. A compound according to claim 3 which is selected from: L-(5-oxoprolyl)-L-histidyl-L-tryptohyl-L-threonyl-L - tyrosyl - glycyl - L - leucyl - L - arginyl - L - prolyl-glycinamide and its non-toxic acid addition salts.

6. A compound according to claim 1 defined by formula II wherein R is tosyl; $R^1$ is benzyl; $R^2$ is nitro, $R^3$ is $NH_2$ and $R^4$ and $R^5$ are benzyl.

References Cited

Fujino et al.: Biochem. Biophys. Res. Comm., *49*, 698–705 (1972).

Monahan et al.: Biochem. Biophys. Res. Comm., *48*, 1100–1105 (1972).

LEWIS GOTTS, Primary Examiner

R. J. SUYAT, Assistant Examiner

U.S. Cl. X.R.

424—177